United States Patent [19]

Hsu et al.

[11] Patent Number: 5,246,652
[45] Date of Patent: Sep. 21, 1993

[54] METHOD OF MAKING WOOD COMPOSITES TREATED WITH SOLUBLE BORON COMPOUNDS

[75] Inventors: Wu-Hsiung E. Hsu, Orleans; Frank Pfaff, Jr., Nepean, both of Canada

[73] Assignee: Forintek Canada Corp., Ottawa, Canada

[21] Appl. No.: 893,673

[22] Filed: Jun. 5, 1992

[51] Int. Cl.$^5$ ............................................. B29C 43/52
[52] U.S. Cl. .................................. 264/109; 252/607; 264/83; 264/122
[58] Field of Search .......................... 264/83, 109, 122; 252/607

[56] References Cited

U.S. PATENT DOCUMENTS 4,104,374  8/1978  Reuther et al. ..................... 264/109
4,228,202 10/1980  Tjannberg ............................. 264/109
4,935,457  6/1990  Metzner et al. ..................... 264/109

*Primary Examiner*—Mary Lynn Theisen
*Attorney, Agent, or Firm*—Trevor C. Klotz

[57] ABSTRACT

A novel method of producing a wood composite treated with a soluble boron compound is disclosed. Either a phenol-formaldehyde resole or novolac type resin can be used as the binder for a wood furnish. The wood furnish is surface treated with either the resole type resin or novolac resin together with a water soluble boron compound whereafter the surface treated wood furnish is formed into a mat and then consolidated in a press. When novolac is used as the resin, the consolidation takes place under sufficient pressure, heat and time in order to cure the novolac type resin and to form the wood composite. Optionally, the curing of the novolac resin can be promoted by injecting the compressed mat with steam, rather than by means of heated press platens. However, if a resole type resin is employed as the binder, while in its consolidated condition, pressurized steam is injected into the consolidated mat for a time sufficient to cure the binder and form the composite. The wood composite so produced and which contains the soluble boron compound, exhibits acceptable internal bond strength, and due to the inclusion of the boron compound, renders the composite less susceptible to biological attack and more fire retardant than conventional composites employing phenol-formaldehyde alone as the thermosetting adhesive.

23 Claims, No Drawings

METHOD OF MAKING WOOD COMPOSITES TREATED WITH SOLUBLE BORON COMPOUNDS

FIELD OF INVENTION

The present invention relates to wood composites treated with a soluble boron compound and which exhibits resistance to biological attack and fire. More particularly, the present invention relates to the use of water soluble sodium borates or boric acid in the production of wood composites where the wood particles are bonded together by a thermosetting phenolformaldehyde resin.

BACKGROUND OF THE INVENTION

Like wood, wood composites are susceptible to biological attack from wood destroying fungi and insects. They are also very vulnerable to fire. A wide range of wood preservatives and fire retardants has been developed for wood treatment. However, many preservatives are high in mammalian toxicity and have adverse effects on the environment. Some may also be detrimental to the wood itself.

Typically, sodium borates have efficacy as preservatives and fire retardants for wood products. They are also low in cost and mammalian toxicity, and have a minimum environmental impact. Accordingly, many attempts have been made to use borates to pre-treat wood furnish, such as wood wafers, particles and fibres in the manufacture of wood composites such as wafer board and particle board. However, and hitherto, it has been recognized that sodium borates result in poor adhesive bonding, even at very low boron retentions, when phenolformaldehyde resins are used as the binder.

For example, in an article entitled "Compatability of Nonacidic Waterborne Preservatives with Phenol-Formaldehyde Adhesive" by C. B. Vick, R. C. DeGroot and J. Youngquist published in the Feb. 1990 edition of Forest Products Journal, Volume 40, No. 2 p. 16, it was reported that three borate preservatives, namely ammoniacal copper borate, ammoniacal pentaborate and disodium octaborate tetrahydrate resulted in poor particle bonding even at the lowest retention value for the preservatives. Additionally, P. E. Laks and R. D. Palardy reported that hydrated water-soluble borates such as disodium octaborate tetrahydrate interfered with the glue line strength development of phenolic adhesives in an article titled "The Development of Borate-Containing Flake Board", First International Conference on Wood Protection with Diffusable Preservatives, proceedings 47355, Nashville, Tennessee.

Knudson et al in U.S. Pat. No. 4,879,083 issued Nov. 7, 1989 also recognized that the strength of wafer board was reduced to an unacceptable level when disodium octaborate tetrahydrate was used as an additive, but found that if a low solubility borate such as zinc borate or anhydrous borax was used as the preservative, the resulting bond strength was not significantly impaired. By employing a low solubility rate borax such as zinc borate or anhydrous borax in a conventional press having heated press platens, he observed that the amount of borax dissolved by the steam front as it moved through the board during consolidation is such that the resin viscosity is not impaired sufficiently to effect the bond. When, however, a soluble borate was employed as an additive, the strength of the resultant board was found by him to be at an unacceptable level and was believed by him to be due to solubility of water soluble borate on the adhesive.

BRIEF DESCRIPTION OF THE PRESENT INVENTION

Contrary to prior findings and teachings of Knudson and others, an object of the present invention is to provide a simple process for making phenol-formaldehyde resin bonded wood composites with improved resistance to biological attack and fire, using water soluble borates such as sodium borate or boric acid. Advantageously, the subject invention is also compatible with existing plant technology as used in making wood composites.

In accordance with one aspect of the invention, a novolac type of phenol-formaldehyde thermosetting resin is employed as a binder, and as is known in the art, is the product of a two-stage process wherein the resin is prepared with an acid catalyst, and only part of the necessary formaldehyde is added to the initial "cook" such that the mole ratio of formaldehyde to phenol is less than 1. The remainder of the required formaldehyde is added later, usually as hexamethylenetetramine, to raise its mole ratio to phenol above unity and which decomposes in the final curing step in the presence of heat and moisture, to yield formaldehyde and ammonia. In other words, these resins do not themselves react further to give cross-linked resins, but must be reacted with formaldehyde.

In accordance with another aspect of the invention, the phenol-formaldehyde can be in the form of a resole resin binder that is made in a one-stage process, as is well known in the art, and which involves reacting phenol, formaldehyde and an alkaline catalyst together.

In accordance with the foregoiong, our invention relates to a novel method of producing a wood composite which has been treated with a soluble boron compound and wherein a wood furnish is surface treated with a boron compound comprising at least one of a water soluble borate and boric acid and with a thermosetting phenol-formaldehyde binder comprising one of a novolac resin and a resole resin, forming the surface treated wood furnish into a mat, compressing the mat for a time and at a temperature sufficient to cure the binder and to form the wood composite, and which is further characterized by applying heat to the compressed mat by means of one of heated press platens and the direct injection of pressurized steam when the binder in the mat is a novolac resin, and by means of the direct injection of pressurized steam when the binder in the mat is a resole resin.

It is believed that the one-stage resole resin is unsuitable with sodium borate as the preservative in wood composites because any sodium borate or boric acid will react instantaneously with the alcohol group of the one-stage phenol-formaldehyde resin when the borate comes into contact with liquid resin or powdered resin which is liquified during hot pressing. This causes immediate gelling of the resin and thus the resin cannot develop adequate bonding strength.

Surprisingly and unexpectedly, we have found that one-stage phenolic resin (resole resin) which hitherto could not be combined with a water soluble borate as a wood preservative without significantly hampering the bond strength of the composite, can still advantageously be employed, provided the application of heat during the pressing operation is applied in the form of the direct injection of pressurized steam, preferrably utilizing a self-sealing or sealed steam press. It is believed that the high pressure and temperature of the steam dissolves sodium borates and boric acid and forces them to separate from the resin and to penetrate into the wood. Consequently, the interference and contamination from borate or boric acid hitherto experienced when using resole resin are minimized during resin cure.

We have also surprisingly found that when using a two-stage phenol-formaldehyde resin (novolac resin) binder in combination with water soluble borates or boric acid as the preservative, either conventional hot pressing using heated press platens or pressurized steam injection in a steam press can be employed, and will produce a finished wood product having acceptable bond strength.

TABLE 1

Production Parameters of Waferboard Test Panels

| | |
|---|---|
| Panel | 610 × 610 × 10 mm @ 625 kg/m$^3$ target density |
| Furnish | Aspen wafers (0.75 mm thick, 75 mm long) |
| Resin Content | 1) 2.0% and 2.5% phenol-formaldehyde (novolac) |
| | 2) 2.0% and 2.5% phenol-formaldehyde (resole) |
| Wax Content | 1.5% slack wax |
| Wafer Orientation | Random |
| Borate Additives | 1) Sodium borate @ 0.85% mixed with resin |
| | 2) Boric acid @ 1.0% mixed with resin |
| Press Temperature | 215° C. |
| Steam Pressure | 1050 kPa injection |
| Total Press Time | 4 minutes (includes close and open time) |

The results are summarized in Table 2

TABLE 2

Effect of Sodium Borate and Boric Acid on the Bond Strength of Waferboard Bonded with Phenol-Formaldehyde Resins

| Pressing Method | Phenolic Resin Type[3] | Treatment[1] | Internal Bond Strength (kPa) | Strength Loss (%) |
|---|---|---|---|---|
| Conventional | Resole (2.0%) | Control | 499 | — |
| | | Tim-Bor (1.0%) | 230 | 54 |
| | Resole (2.5%) | Control | 528 | — |
| | | Tim-Bor (0.85%) | 380 | 28 |
| | [2]Resole (2.0%) | Control | 313 | — |
| | | Boric Acid (1.0%) | 126 | 60 |
| Conventional | Novolac (2.5%) | Control | 472 | — |
| | | Tim-Bor (0.85%) | 450 | 4.7 |
| | [2]Novolac (2.0%) | Control | 317 | — |
| | | Boric Acid (1.0%) | 293 | 8.0 |
| Steam-Pressed | Resole (2.5%) | Control | 556 | — |
| | | Tim-Bor (0.85%) | 534 | 3.9 |
| | Novolac (2.5%) | Control | 575 | — |
| | | Tim-Bor (0.85%) | 572 | 0.5 |

[1]Tim-Bor ™: Disodium octaborate tetrahydrate (U.S. Borax)
[2]Low quality wafers
[3]Resin content expressed as a precentage of the oven dry weight of wood

DESCRIPTION OF PREFERRED EMBODIMENTS:

The preferred water soluble borate is sodium borate, either in the form of disodium tetraborate pentahydrate or preferrably disodium octaborate tetrahydrate; the latter being sold under the trade-mark TIM-BOR by U.S. Borax. TIM-BOR has the advantage of being registered with the EPA in the U.S. under registration number 1624-39 and in Canada with Agriculture Canada under number 18879.

The water soluble borate and resin preferrably are mixed, and together used as a surface treatment for the furnish. The preservative can also be added during the second stage of the novolac resin preparation, but not before. Additionally, both the preservative and resin in either novolac or resole form can be added to the furnish by means of soaking, spraying, dusting or dipping.

The quantity of water soluble borates may exceed 10% based on its intended end use application, with from 0.1 to 10% based on oven dry weight of the furnish being the preferred range.

Typical press platen temperatures used with the novolac type resin can range from 200° C. to 225° C., and steam, used with either novolac or resole resins can range from 50 to 200 psig. In Table 1 set out below, the following production perameters were used in preparing wafer board panels.

From Table 2, it is apparent that the sodium borates or boric acid did not significantly interfere with the adhesion development as determined by the internal bond strength of the two-stage phenolic formaldehyde resin when a contact heating press is used, or with the internal bond strength of a one-stage (resole) or two-stage (novolac) phenol-formaldehyde resin when subjected to pressurized steam injection.

We claim:

1. A method of producing a wood composite that has been treated with a boron compound comprising:
    surface treating a wood furnish with a mixture of a boron compound comprising at least one of a water soluble borate and boric acid and a thermosetting phenol-formaldehyde binder in the form of novolac resin;
    forming said furnish which has been surface treated into a mat; and
    consolidating said mat under the application of pressure and heat for a time and at a temperature sufficient to cure said resin and to form said wood composite.

2. The method as claimed in claim 1, wherein said wood furnish is at least one of wood particles, wood fibres and wood flakes.

3. The method as claimed in claim 2, wherein said boron compound is sodium borate.

4. The method as claimed in claim 3, wherein the sodium borate is disodium octaborate tetrahydrate.

5. The method as claimed in claim 3, wherein the sodium borate is disodium tetraborate pentahydrate.

6. The method as claimed in claim 3, wherein said mixture is in the form of a powder and is surface treated on said furnish by means of blending.

7. The method as claimed in claim 3, wherein said mixture is in the form of a liquid and is surface treated on said furnish by means of spraying or soaking.

8. The method as claimed in claim 4, wherein said sodium borate is present in an amount from 0.1 to 10% based on the oven dry weight of said furnish.

9. The method as claimed in claim 8, wherein said mat is consolidated between heated press platens at a temperature from 200° C. to 225° C.

10. The method as claimed in claim 1, wherein said binder is prepared by first reacting in the presence of an acid catalyst a phenol with a formaldehyde to produce a first phenol-formaldehyde product having a mole ratio of formaldehyde to phenol which is less than 1, and further reacting said first product with additional formaldehyde to produce a second phenol-formaldehyde product having a mole ratio of formaldehyde to phenol which is greater than 1.

11. The method as claimed in claim 10, wherein the formaldehyde added to said first product is hexamethylenetetramine.

12. The method as claimed in claim 11, wherein said boron compound is added to said binder during or after the addition of hexamethyleneteltramine.

13. A method of producing a wood composite containing a boron compound comprising:
surface treating a wood furnish with a boron compound comprising at least one of a water soluble borate and boric acid and a thermosetting phenol-formaldehyde binder in the form of a resole resin;
forming said surface treated furnish into a mat; and
consolidating said mat in a press and injecting the consolidated mat with pressurized steam at a temperature and for a time sufficient to cure said thermosetting binder and to form said wood composite.

14. The method as claimed in claim 13, wherein said furnish is at least one of wood particles, wood fibres and wood flakes.

15. The method as claimed in claim 13, wherein said boron compound is sodium borate.

16. The method as claimed in claim 15, wherein said boron compound is disodium octaborate tetrahydrate.

17. The method as claimed in claim 15, wherein said boron compound is disodium tetraborate pentahydrate.

18. The method as claimed in claim 15, wherein said mixture is in the form of a powder and is surface treated on said furnish by means of blending.

19. The method as claimed in claim 15, wherein said sodium borate and said binder are each in liquid form and are separately surface treated on said furnish by means of spraying.

20. The method as claimed in claim 15, wherein said sodium borate is present in an amount from 0.1 to 10% based on the oven dry weight of said furnish.

21. The method as claimed in claim 13, wherein said consolidated mat is injected with pressurized steam in a steam press at from about 50 to about 200 psig.

22. A method of producing a wood composite treated with a boron compound comprising the steps of:
surface treating a wood furnish with a boron compound comprising at least one of a water soluble borate and boric acid and with a thermosetting phenol-formaldehyde binder comprising one of a novolac resin and a resole resin;
forming said surface treated wood furnish into a mat;
pressing said mat between two opposed press platens for a time and at a temperature sufficient to cure said binder and form said wood composite;
said method being further characterized by applying heat to the compressed mat by means of at least one of heated press platens and injected pressurized steam when said binder in said surface coating is a novolac resin, and by means of injected pressurized steam when said binder in said surface coating is a resole resin.

23. The method as claimed in claim 22 wherein the temperature of the heated press platens is from 200° C. to 225° C. and pressure of said steam is from 50 to 200 psig and is injected into said consolidated mat in a steam press.

* * * * *